(12) United States Patent
Melvin, Jr. et al.

(10) Patent No.: US 8,397,288 B2
(45) Date of Patent: Mar. 12, 2013

(54) SYSTEM AND METHOD FOR OPERATION OF OPEN CONNECTIONS FOR SECURE NETWORK COMMUNICATIONS

(75) Inventors: Charles W. Melvin, Jr., Dudley, GA (US); Derek Nicholas Gibbs, Madison, MS (US)

(73) Assignee: Itron, Inc., Liberty Lake, WA (US)

( * ) Notice: Subject to any disclaimer, the term of this patent is extended or adjusted under 35 U.S.C. 154(b) by 223 days.

(21) Appl. No.: 12/899,496

(22) Filed: Oct. 6, 2010

(65) Prior Publication Data

US 2012/0054852 A1   Mar. 1, 2012

Related U.S. Application Data

(60) Provisional application No. 61/377,032, filed on Aug. 25, 2010.

(51) Int. Cl.
*G06F 15/16* (2006.01)

(52) U.S. Cl. .......... 726/15; 713/150; 370/252; 370/328; 370/338; 370/389; 370/401; 709/222; 709/229; 709/230

(58) Field of Classification Search .................... 726/15; 713/150; 370/252, 328, 338, 389, 401; 709/222, 709/229, 230

See application file for complete search history.

(56) References Cited

U.S. PATENT DOCUMENTS

| 6,978,308 | B2 | 12/2005 | Boden et al. | |
|---|---|---|---|---|
| 6,993,037 | B2 | 1/2006 | Boden et al. | |
| 7,117,526 | B1 | 10/2006 | Short | |
| 7,623,500 | B2* | 11/2009 | Riittinen et al. | 370/338 |
| 2004/0120357 | A1* | 6/2004 | Kekki | 370/521 |
| 2006/0105741 | A1 | 5/2006 | Suh et al. | |
| 2008/0151916 | A1* | 6/2008 | Jetcheva et al. | 370/401 |

FOREIGN PATENT DOCUMENTS

| GB | 2414642 | 11/2005 |
|---|---|---|
| KR | 20040100160 | 12/2004 |
| WO | 2008044581 | 4/2008 |

* cited by examiner

*Primary Examiner* — Thanhnga B Truong
(74) *Attorney, Agent, or Firm* — Dority & Manning, P.A.

(57) ABSTRACT

In one embodiment, a system for extending IPSec communication over a wireless mesh network is disclosed. A VPN appliance is operative to establish an end-to-end communication tunnel with at least one of a plurality of wireless mesh gateways. The VPN appliance is configured for secure communication with at least one of the mesh gateways, by establishing an outer tunnel. At least one of the wireless mesh gateways is configured to establish connection with a plurality of wireless routers, where the wireless routers are configured to establish connection with a plurality of intelligent communication devices. Multiple paths exist for routing data packets from the plurality of mesh gateways to the plurality of intelligent communication devices. The VPN appliance is also configured to establish a plurality of inner tunnels nested within the outer tunnel.

18 Claims, 11 Drawing Sheets

SYSTEM AND METHOD FOR OPERATION OF OPEN CONNECTIONS FOR SECURE NETWORK COMMUNICATIONS

CROSS REFERENCE TO RELATED PATENT APPLICATION

This application claims the benefit, pursuant to 35 U.S.C. §119(e) of U.S. provisional Application Ser. No. 61/377,032, filed Aug. 25, 2010, entitled "System and Method for Operation of Open Connections for Secure Network Communications" by Charles N. Melvin and Derek N. Gibbs, the disclosure for which is hereby incorporated by reference in its entirety.

FIELD OF THE INVENTION

The present invention generally relates to network routers, and more specifically to an intelligent communications device for a smart grid, hereinafter also referred to as an "apparatus" or "network apparatus", for managing interconnection of various electrical devices and facilities.

More particularly, according to one or more aspects, the present invention relates to a system and method for operation of open connections for secure network communications.

SUMMARY OF THE INVENTION

In one aspect, the present invention relates to a system and method for controlling operation of a plurality of electronic devices in a smart grid. In one or more exemplary embodiments, an intelligent communications device is operatively connected with other devices and/or systems and one or more electrical distribution networks. One or more of these other electronic devices may work in collaboration with the intelligent communications device in a smart grid network infrastructure. In one or more embodiments, the electronic devices may be arranged in various configurations to operate in networks such as LAN, WAN, and/or HAN networks.

In one embodiment, the intelligent communications device is configured with other devices and/or monitoring equipment for monitoring and management of electrical energy consumption. The intelligent communications device operates on wireless communications networks and according to one or more wireless protocols such as commercial cellular, Bluetooth, and/or 802.11 protocols.

In one embodiment, the intelligent communications device is field upgradeable and is configured such that additional hardware can be installed for enabling new protocols or technologies to be developed. The intelligent communications device is operative to implement open source software configured to facilitate integration of different types of devices with additional circuitry and/or hardware. Further, the intelligent communications device is operable to update the open source software periodically or at a predefined time.

In another aspect, the present invention relates to a method for extending IPSec communication over a wireless mesh network is disclosed. In one embodiment, the wireless mesh network includes a plurality of wireless mesh gateways, a plurality of wireless routers, a plurality of intelligent communications devices operating in a smart grid, and a Virtual Private Network (VPN) appliance that is operative to establish an end-to-end communication tunnel with at least one of the plurality of wireless mesh gateways.

In yet another aspect, the present invention relates to a system for extending IPSec communication over a wireless mesh network is disclosed. In one embodiment, the wireless mesh network includes a plurality of wireless mesh gateways, a plurality of wireless routers, a plurality of intelligent communications devices operating in a smart grid, and a Virtual Private Network (VPN) appliance that is operative to establish an end-to-end communication tunnel with at least one of the plurality of wireless mesh gateways.

In yet another aspect, the present invention relates to a computer-readable medium having stored computer-executable instructions is disclosed. In one embodiment, the instructions are executable by one or more processors to cause a computer to perform functions for extending IPSec communication over a wireless mesh network. The wireless mesh network includes a plurality of wireless mesh gateways, a plurality of wireless routers, a plurality of intelligent communications devices operating in a smart grid, and a Virtual Private Network (VPN) appliance that is operative to establish an end-to-end communication tunnel with at least one of the plurality of wireless mesh gateways.

DETAILED DESCRIPTION OF THE INVENTION

Description of the various embodiments detailed below is for understanding the invention. It will be understood that the invention is not limited to the particular embodiments described herein, but is capable of various modifications, rearrangements and substitutions, which will now become apparent to those skilled in the art without departing from the scope of the invention. Therefore, it is intended that the following claims cover all such modifications and changes that fall within the spirit and scope of the invention.

In alternative embodiments, system, process, and apparatus may include additional, fewer, or different components. In addition, the each component may include additional modules, software, and interface devices that may be appended on requirement to operate the present invention in alternate embodiments.

Figure 1:
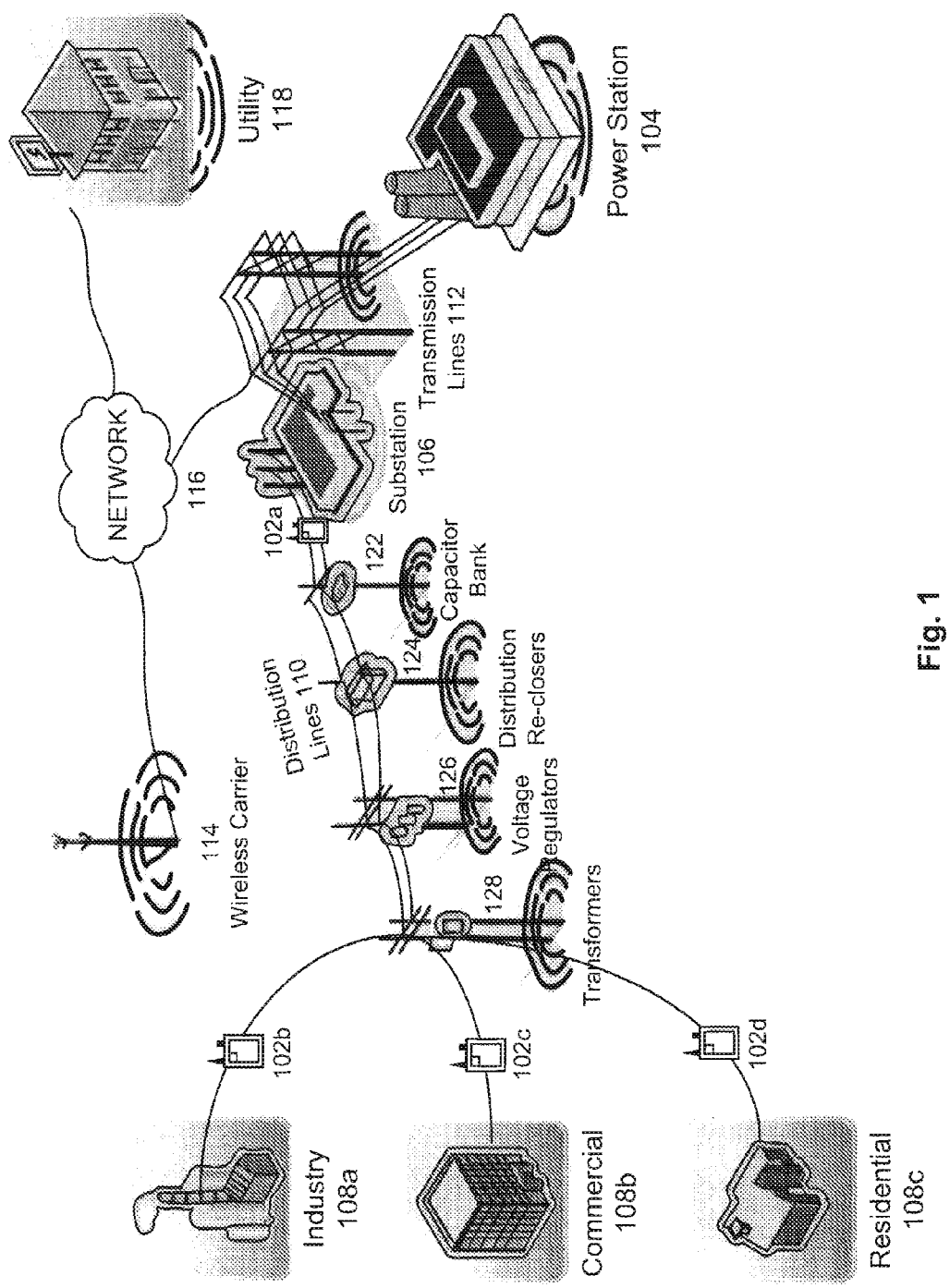
FIG. 1 is a schematic illustration of an overall environment in which one or more aspects of the present invention can be practiced.

Referring to FIG. 1, an intelligent communications device 102 is disclosed, for a smart grid communicatively coupled to a plurality of devices and/or facilities for management of energy requirements. Integration of the intelligent communications device 102 into the smart grid infrastructure may be performed.

FIG. 1 illustrates an environment in which the present invention may be practiced. The environment may include a plurality of electrical generation facilities such as thermal power plants, hydro-based power plants (dams, for example), solar powered electricity generation units, and wind powered electricity generation units. Various electricity-generating plants are collectively referred to as power generation units 104. The electricity generated from the power generation units 104 may be distributed through a plurality of high voltage transmission lines 112 to a substation 106. For example, high voltage electricity may be distributed via plurality of towers and a plurality of medium voltage distribution cables 110.

By way of example and not a limitation in one implementation, the substation 106 may receive power from the plurality of high voltage transmission lines 112 from at least one of the plurality of substations such as power station 104. Further, the substation 106 may be associated with an intelligent communications device 102. The intelligent communications device 102 may monitor various parameters such as quality of electricity and electrical load.

The substation 106 may then distribute low voltage electricity to residential entities 108c, industrial entities 108a, and/or commercial entities 108b. The medium voltage distribution lines 110 may include attachments of various devices for improvement of quality electricity. As such, the plurality of distribution lines 110 may run moderate distances and are affected by cable resistance, electrical grid loading, and other factors which constantly effect the operation and efficiency of the electric grid. In order to compensate for a variety of operating conditions, the plurality of distribution lines 110 may include connections to capacitor banks 122, distribution re-closers 124, voltage regulators 126, transformers 128 and other types of equipment.

The electricity may be supplied to the one or more industrial entities such as industry 108a, via intelligent communications device 102b. Likewise, the plurality of distribution lines 110 may feed electricity to one or more commercial entities such as commercial entity 108b, one or more residential entities 108c, through intelligent communications devices 102c and 102d. Hereinafter, intelligent communications devices 102a, 102b, 102c, and 102d may be collectively referred to as "intelligent communications device 102."

The intelligent communications device 102 may be configured to operate with a central control station, regulatory authority, audit compliance authority, and/or electrical monitoring systems. Apart from monitoring the various parameters such as electrical quality, the intelligent communications device 102 may be coupled wirelessly to a plurality of wireless carriers such as 114. Alternatively, the intelligent communications device 102 may be coupled with communications network 116 using powerline communication. Further, the wireless carrier 114 may receive signals that may be utilized for moderating the distribution of electricity from the substation 106 to industrial entity 108a, commercial entity 108b, and/or residential entity 108c.

The intelligent communications device 102 may be connected with a plurality of utilities in a building, a commercial complex, and/or an industry. By way of example and not a limitation, in one implementation, intelligent communications device 102 may be connected to utility 118. In an embodiment, the utility 118 may include lighting systems, refrigerators, air conditioners, computers, televisions, home theaters, electric irons, water filters, air filters, air compressors, and/or vacuum cleaners. The intelligent communications device 102 may directly control the utility 118. In another embodiment, one or more intelligent communications devices 102 may indirectly control the utility 118. In yet another embodiment, the utility 118 may be partially controlled by one or more intelligent communications devices 102 for modulating the electrical consumption. It may be noted that only one implementation is provided; however, those skilled in the art would appreciate that various other implementations are possible without deviating from the scope and spirit of the invention.

The utility may be grouped into essential and non-essential electrical equipment for purposes of control. In this embodiment, the intelligent communications device 102 may be programmed to monitor the one or more utilities 118 on a rule based program.

In an embodiment of the present invention, the intelligent communications device 102 may be coupled to multiple consumers such as industrial entities 108a, commercial entities 108b, and residential entities 108c. The consumer 108a, 108b, and 108c may be hereinafter collectively referred to as 'consumers 108'. The intelligent communications device 102 may facilitate management of electricity to one or more consumers 108. Additionally, the intelligent communications device 102 may also be integrated to communications backhaul providers that may work in synchronization for accumulating data related to electrical consumption, load distribution, quality of electricity, power factor, and/or failure of equipment associated with the distribution of electricity. The information may be communicated to control and monitoring station, either through the network 116 or through wireless carriers 114.

In an embodiment of the present invention, the consumers 108 may be distributed in a geographically area and may be connected to each other through a smart grid. In addition, each consumer 108a may have one or more smart appliances. The smart appliances may be managed by the intelligent communications device 102 for optimizing electricity consumption.

Figure 2:
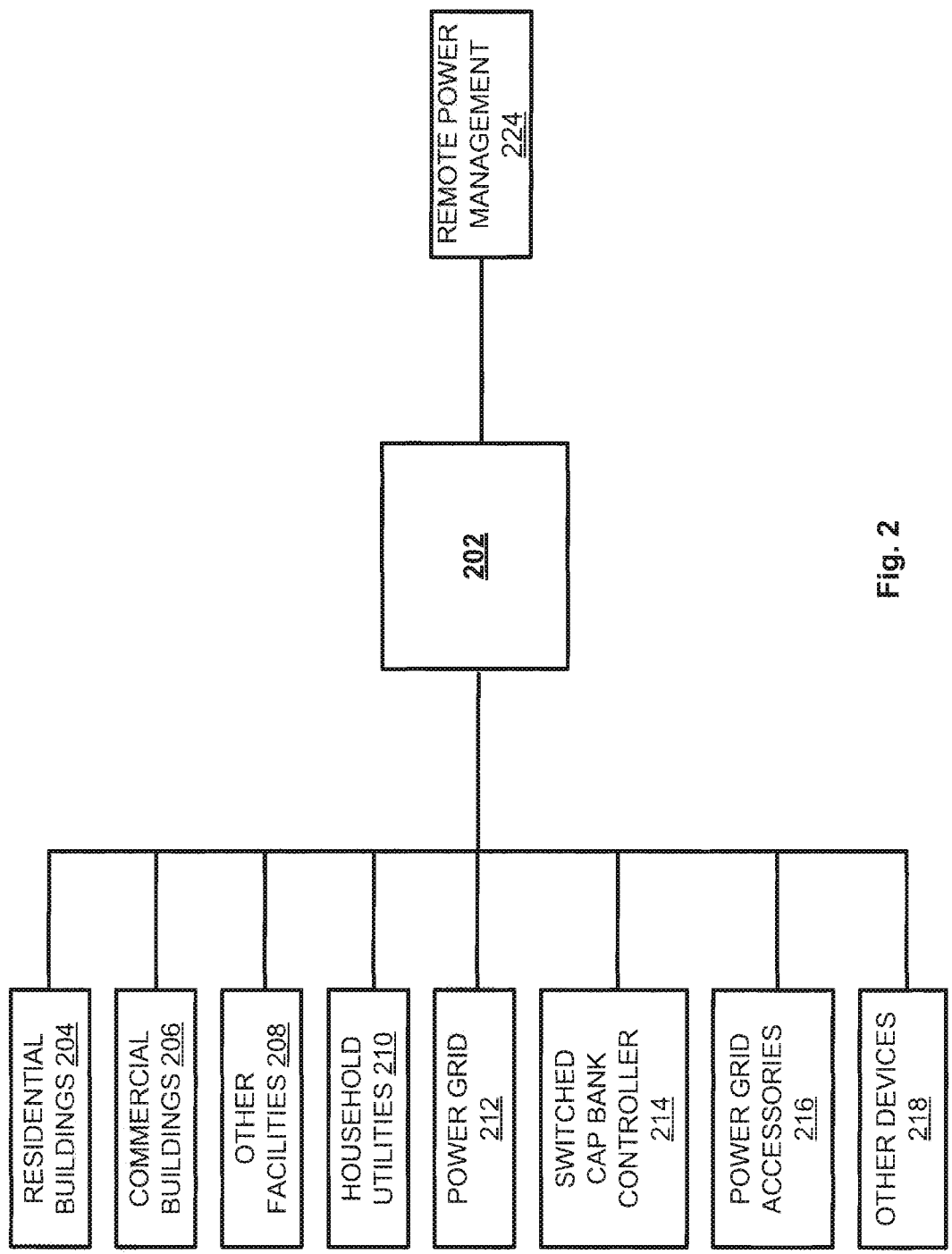
FIG. 2 shows various facilities, devices and equipment interfaced with an intelligent communications device, according to one or more embodiments of the present invention.

Referring to FIG. 2 an arrangement of configuring various electrical facilities with an intelligent communications device 202 is shown, according to one embodiment of the present invention. The intelligent communications device 202 may communicate with the plurality of devices and/or facilities, such as but not limited to, residential buildings 204, commercial entities 206, other facilities 208, household utilities 210, power grids 212, switched cap bank controllers 214, grid accessories 216, other devices 218, and remote power management utilities 224. Other facilities 208 may include but not limited to schools, small offices, sports complexes, shops, malls, federal offices, utility complexes, or other types of buildings having electrical connection and consuming electricity. The intelligent communications device 202 may facilitate energy management for one or more of the devices and/or facilities as shown.

Power Management

In an embodiment of the present invention, the intelligent communications device 102 may enable distribution companies to reduce the overall power requirement through better management. This in turn may help in reducing the need for power generation thereby reducing environmental damage. Further, the intelligent communications device 102 may act as a communications hub for monitoring electrical usage, power consumption, quality of electricity, and/or analysis of electrical load, where examples of load type may include inductive load and/or capacitive load. The communications hub may interface various devices in order to monitor electricity consumption and/or power usage.

The intelligent communications device 102 may enable integration of various utilities with the grid for optimizing the overall performance of the system. For example, the load requirement of a particular building may be assessed/monitored using the intelligent communications device 102. The data collected by the intelligent communications device 102 from the various utilities may be utilized for improving the overall electrical consumption of these utilities thereby saving cost and electricity. Alternatively, the intelligent communications device 102 may monitor the performance of different electrical utilities and may facilitate their management in an optimized way.

In another embodiment, the intelligent communications device 102 may be utilized by distribution companies for monitoring the quality of electricity and load characteristics for a specific area. The data recorded by the intelligent communications device 102 may be utilized for increasing the operational efficiency of the power grid.

In another embodiment, the intelligent communications device 102 may facilitate management of demand response for a grid. Currently, power generation and/or power distribution companies face pressure to reduce load either electronically or manually. In such settings, transmission grid operators use demand response to request load reduction in order to manage demand. One or more aspects of the present invention according to this exemplary embodiment allow for transmission grid operators to utilize the intelligent communications device 102 for electronically managing the demand response of electricity.

Integration with Power Grid

In one embodiment, the intelligent communications device 102 may include a communication module for connecting it with a smart grid. In this aspect, the intelligent communications device 102 may increase the performance of the smart grid making it more adaptable and cost effective. In addition, the intelligent communications device 102 may enable utilities to interface with the grid irrespective of the underlying technology, network, or assets. The intelligent communications device 102 may be flexible to accommodate any configuration changes and/or bandwidth changes without affecting the underlying architecture/technology.

In another embodiment of the present invention, the intelligent communications device 102 may communicate with other apparatuses. The communication may be either wireless or through wired connection. Such communication may occur in response to a critical event such as power surge, excess demand, low power factor, when immediate action is required for safeguarding the electrical equipments associated with transmission infrastructure. In another embodiment, the communication between different apparatuses may occur on a continuous basis for optimizing the performance of the system.

Field Upgradability

In another aspect of the present invention, the intelligent communications device 102 may be field-upgradeable and may provide field replaceable units for preventing obsolescence. The intelligent communications device 102 may allow utilities to add multiple communication technologies to the smart grid communication infrastructure with change of the underlying technology. By integrating multiple communication technologies, the intelligent communications device 102 may act as a universal hub, to reduce the cost of purchasing additional equipment for implementing multiple network communications protocols. Consumers 108 may integrate multiple appliances and multiple communication technologies using intelligent communications device 102 thereby reducing the total cost of ownership of the equipment. Additionally, consumers 108 may upgrade the intelligent communications device 102 to integrate new communication protocols by just installing additional circuitry without changing existing equipment.

The intelligent communications device 102 may further include a software update module that may connect to the Internet for availability of firmware updates. In response to availability of firmware updates, the software update module may back-up the current firmware before upgrading the intelligent communications device 102 with the new firmware. Failure to implement the new firmware may result in reinstallation of the old firmware from the back up.

In another embodiment of the present invention, the intelligent communications device 102 may include additional slots for inserting PCB boards. These PCB boards may include circuitry for enabling specific protocol, for example, the PCB on PCB board may implement EDGE protocol. Similarly, in another example, a PCB board may implement WiMax protocol. Field service personnel may insert additional PCB boards for upgrading the existing communication protocol without having to replace the intelligent communications device 102. Thus, the intelligent communications device 102 may be upgraded while in operation.

In another embodiment of the present invention, the intelligent communications device for a smart grid may include PCB boards supporting various communication technologies such as but not limited to, WiMax, EDGE, IPv4/IPv6, Bluetooth, Infrared, broadband over powerline, and Ethernet. Software configured in the intelligent communications device 102 may be utilized to enable/disable one or more communication boards. Thus, in one implementation, the apparatus may support Ethernet. In another implementation, the intelligent communications device 102 may support Ethernet and Bluetooth. In these scenarios, the field service personnel may update the intelligent communications device 102 by enabling the boards supporting various communication technologies remotely.

In yet another embodiment of the present invention, the intelligent communications device 102 may include utilities, circuitry for upgrading it on site. Further, the intelligent communications device 102 may include software and/or modules for adding multiple communication technologies to the smart grid communications infrastructure based on future needs without having to replace an entire system backbone. By virtue of having capabilities for adding new devices and facilities, the intelligent communications device 102 may allow consumers to purchase and integrate non-interoperable proprietary technologies from multiple vendors. Vendors may integrate heterogeneous devices using intelligent communications device 102 thereby creating an open environment. In this aspect, the intelligent communications device 102 may allow for consumers to avoid being committed to a specific vendor.

Consumption Monitoring

Consumers of electricity may save money by planning their energy requirements in area implementing Time-Of-Use (TOU) pricing. Consumers may plan the use of electrical appliances in off-peak hours, when the cost of electricity is less, for reducing the total cost of electricity consumption. The intelligent communications device 102 may facilitate the reduction in total consumption of electricity by automatically switching on the electrical appliances in non-peak hours.

Network Protocol Implementation

The intelligent communications device 102 may be based on Internet Protocol (IP) thereby providing seamless integration with different type of networks. For example, the intelligent communications device 102 may facilitate communication with both public and private networks. In embodiments, the network may be either a wired network or a wireless network. Further, networks classified on the basis of scale, such as LAN, WAN, HAN, or functional relationships, such as client server, peer-to-peer, and/or active networks, overlay networks are included within the scope the invention. In an exemplary embodiment, the intelligent communications device 102 communicates using TCP/IP. Likewise, the intelligent communications device 102 may interface with other devices implementing conventional protocols.

The intelligent communications device 102 may facilitate smart grid-enabled appliances to communicate wirelessly with electrical distribution companies to manage their overall consumption of electricity. For example, the intelligent communications device 102 may manage consumption of electricity during peak hours for a distribution network. In this aspect, the intelligent communications device 102 may communicate in real-time with various facilities and other devices to optimize energy efficiency.

In an embodiment of the present invention, the intelligent communications device 102 may include an Ethernet interface for connecting it with external network such as LAN, WAN, or HAN. Further, the Ethernet interface may enable communication with Internet thereby facilitating remote management of utilities. The intelligent communications device 102 may record various parameters such as electricity consumption, power usage and may transfer the recorded data to the remote infrastructure management facility for optimization of the electrical consumption. To this end, the intelligent communications device 102 may enable optimum utilization of the grid infrastructure. The intelligent communications device 102 may be built for outdoor use and may be protected from environmental hazards.

The intelligent communications device 102 may be capable of interfacing with various protocols, networking standards, and other specifications. In an example, the intelligent communications device 102 may facilitate communication by implementing WiMax protocol. In another example, the intelligent communications device 102 may communicate using Bluetooth protocol. In embodiments, the intelligent communications device 102 may communicate using other protocols such as but not limited to token ring, EDGE, UDP, datagram and other proprietary Internet communications protocols. In an example, the intelligent communications device 102 may facilitate communication with ZigBee protocol that allows devices in the home to communicate with a smart meter and neighborhood hub.

In an embodiment of the present invention, the electrical distribution companies may analyze the electrical consumption data collected over a specified period for better management of energy. The intelligent communications device 102 may include a communication link with a database for storing electrical consumption data. In an embodiment, the specified period may be an hour, a day, a month, a year, or any combination of these.

The intelligent communications device 102 may facilitate interoperability among smart grid devices, thereby facilitating seamless deployment of smart devices in a smart grid. In this aspect, various smart devices including smart appliances and smart meters may work in harmony with the intelligent communications device 102. Thus, the intelligent communications device 102 may integrate into the existing smart grid deployment without competing with other existing devices. Alternatively, it may enhance the capability of other smart devices. In an embodiment of the invention, the intelligent communications device 102 may allow integration with other devices without the need for installing additional devices and/or interface circuitry. The smart devices can be configured with the intelligent communications device 102 for management of smart appliances for increasing the operational efficiency of the smart grid. Smart appliances refer to the class of products that enable communication with smart meters and neighborhood hub for saving energy.

The intelligent communications device 102 may enable Internet Protocol based communication involving end-to-end connectivity on a public wireless network. The intelligent communications device 102 may further facilitate two-way delivery of real-time energy usage data over a public wireless network. In an embodiment, the real-time data may include location information along with energy usage information.

In an embodiment of the present invention, the intelligent communications device 102 may include one or more communication ports for connecting to different types of communication devices. The intelligent communications device 102 may include switches, hubs or other interface circuitry for coupling with the external devices. Additionally, the intelligent communications device 102 may include a wireless communication module for connecting with wireless appliances and/or smart devices. In this aspect, the wireless devices such as smart appliances may be enabled by low power protocol such as 6 LOWPAN. Alternatively, the wireless devices may be enabled using Bluetooth, EDGE, IEEE 802.11, and/or infrared.

Open Standards Implementation

The intelligent communications device 102 may implement open standards to leveragie existing programs and tools. In this aspect, the intelligent communications device 102 may facilitate rapid application deployment and delivery of the new functionality. For example, the intelligent communications device 102 may update the applications and/or programs in real time. Additionally, updates corresponding to programs and/or applications may be executed at a predefined time in order to update the software, drivers, interface ports, applications. This may ensure that the intelligent communications device 102 may be fully equipped to deny any security attack on it. In another example, interfacing a new smart device with the intelligent communications device 102 may initiate a search for software. Failure to discover appropriate software may result in searching the required software at a remote location such as the Internet. Thus, the intelligent communications device 102 may perform self-healing by automatically scanning and integrating new devices and/or facilities in the smart grid infrastructure.

Enclosure

Figure 3A:
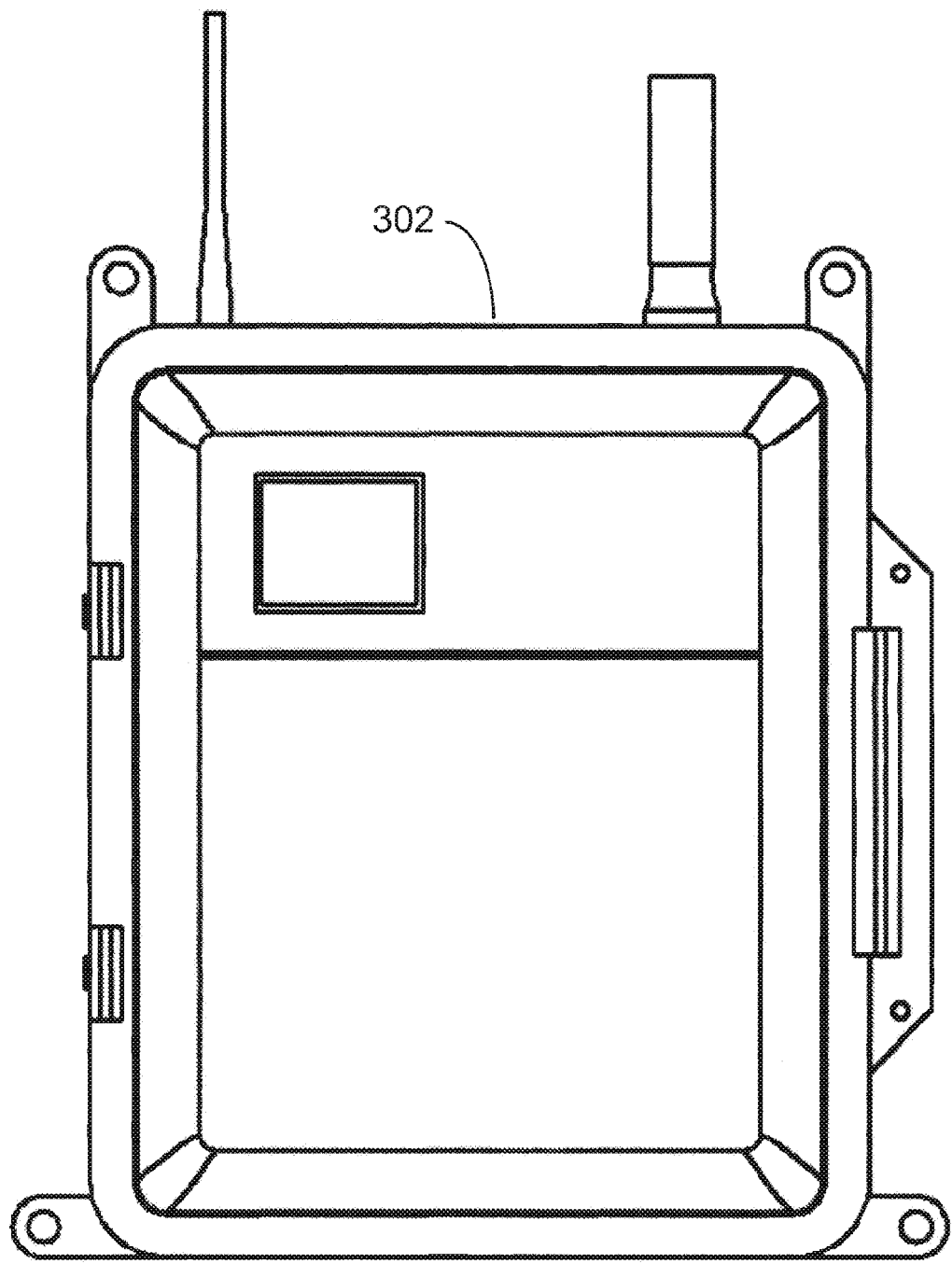
FIG. 3 shows various modules associated with an intelligent communications device according to one embodiment of the present invention.

Referring to FIG. 3A, an outer enclosure 302 associated with the intelligent communications device 102 is shown, according to one embodiment of the present invention. The intelligent communications device 102 may be enclosed in proper casing 302 for rapid deployment. In this embodiment, the modular and compact design of the intelligent communications device 102 may protect it from damage during installation. The modular design may further enable rapid installation of intelligent communications device 102. For example, the compact modular design may facilitate installation of the intelligent communications device 102 within a small space.

In embodiments, the enclosure may be fabricated from metal, plastic, and other materials, which may be combined.

The compact modular design of the enclosure may be modified for installation in hazardous areas such as refineries, gas plants, and CNG stations. Special enclosures may be provided for installing the intelligent communications device 102 in hazardous areas. In an embodiment of the present invention, the casings and/or enclosures may facilitate a long operational lifetime of the intelligent communications device 102.

Figure 3B:
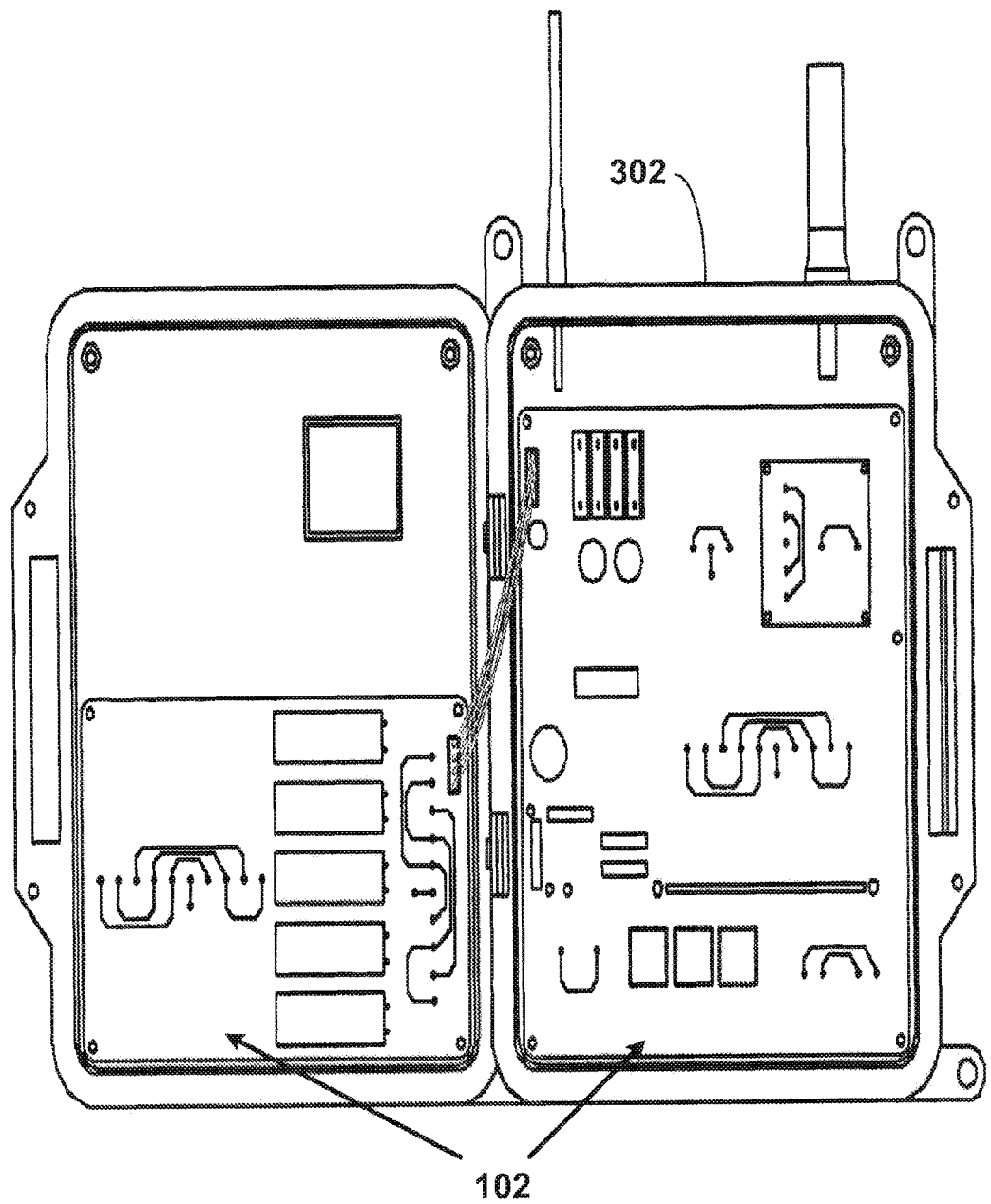

FIG. 3B depicts various circuit boards of the intelligent communications device 102 embedded in the enclosure 302 for safety. The enclosure may include circuitry 306, 308 to raise an alarm if the enclosure is tampered with by an unauthorized entity. Additionally, a provision may be provided in the apparatus that may intelligently determine if the enclosure is opened for repair through an authorized entity.

Management Tools

The intelligent communications device 102 may be interfaced with standard off-the-shelf network management tools. In an embodiment of the present invention, the management tools may be integrated in one or more utilities. Alternatively, the management tools may be implemented on computing devices such as personal computers, servers, and/or electrical control panels.

The intelligent communications device 102 may work in harmony with other smart devices in order to create a seamless infrastructure and to enhance the capability of the smart grid infrastructure. Thus, the intelligent communications device 102 may allow reclosers from one vendor to be integrated with the electronic meters from another vendor for building a collaborative smart grid infrastructure.

The intelligent communications device 102 may implement open source and may facilitate two-way delivery of real-time energy usage data over public wireless network. Further, the open source may simplify deployment of the smart devices in a smart grid infrastructure.

Security Features

In an embodiment of the present invention, the intelligent communications device 102 may secure communication between the intelligent communications device 102 and the external smart devices. For this purpose, the intelligent communications device 102 may implement various security algorithms as known in the art, including IP security and cryptography for secure transfer of data. Internet Protocol Security (IPsec) is a protocol suite for securing Internet Protocol (IP) communications by authenticating and encrypting each IP packet of a data stream. In another embodiment, the intelligent communications device 102 may implement RSA algorithm for securing data transfer.

In embodiments, the intelligent communications device 102 may facilitate collaboration between various interconnected equipment in the smart grid infrastructure. For example, the intelligent communications device 102 may facilitate collaboration between groups of consumers. In another example, the intelligent communications device 102 may facilitate collaboration between different electrical appliances belonging to a particular consumer. In yet another example, the intelligent communications device 102 may facilitate optimization and collaboration of electricity usage related to a particular electrical appliance, for example, a consumer washing machine.

The transmission aspect may be focused on surveillance, fault management, and/or voltage regulation, among others. The intelligent communications device 102 includes software and/or applications for monitoring and surveillance, fault management, and/or voltage regulation. Reports of unusual activity detected by the intelligent communications device 102 may be forwarded to a control station or to security staff via alert. The recorded data may be recorded in a log file, which may be forwarded to the concerned authority in real-time for remedial action. Alternatively, the intelligent communications device 102 may, based on its own capability, resolve the issue without raising an alert.

The distribution aspect may include among other aspects monitoring and management of switches, meters, and/or reclosers. The intelligent communications device 102 may allow integration of various devices into seamless smart grid configuration. For example, a meter from one vendor may be configured with the recloser from another vendor. By implementing open standards in the intelligent communications device 102, the distribution companies can focus on building the smart grid infrastructure without worrying about the product working on a dedicated technology, since the intelligent communications device 102 may act as a universal hub for integrating various technologies.

A consumer may utilize the intelligent communications device 102 for conserving electrical consumption. In this aspect, consumer devices may be directly connected with the intelligent communications device 102. Exemplary consumer devices may include transformers, fault management devices, power meters, water meters, gas meters, load limiters, and disconnect switches. The intelligent communications device 102 may manage these smart devices in an optimum manner for saving electricity.

Solar Power

In an embodiment of the present invention, the intelligent communications device 102 may be solar powered. The outer enclosure of the intelligent communications device 102 maybe fitted with photovoltaic cells that may receive solar energy. The solar energy may be utilized to charge one or more batteries; the charged batteries may allow communication with utility management infrastructure even during a power failure. Thus, the apparatus may work continuously without interruption.

Solar power may be further utilized to provide power for critical activities during a power failure, such as clock, wireless facility, memory and other communication circuitry.

Computer-Executable Software Embodiments

In an embodiment of the present invention, the intelligent communications device 102 may include software and hardware for implementing virtualization. For example, the intelligent communications device 102 may implement hardware virtualization. Implementing virtualization may facilitate the process of disaster recovery, induce higher levels of abstraction, and increased level of security.

In yet another embodiment of the present invention, the intelligent communications device 102 may include software for implementing distributed computing architecture. For example, various software processes may communicate with databases/repositories of the central control station to periodically update the repositories and/or databases. Such an arrangement may reduce the probability of loss of data during disaster and/or failure of other equipment.

In yet another embodiment of the present invention, the software-implemented multiple processes enable processing of data in real time. In this aspect, the software executed by the associated processor may spawn multiple threads for faster execution and real-time monitoring of the utilities. Such implementation may facilitate quick response to adverse events, thereby reducing the probability of failure of the overall infrastructure.

Figure 3C:
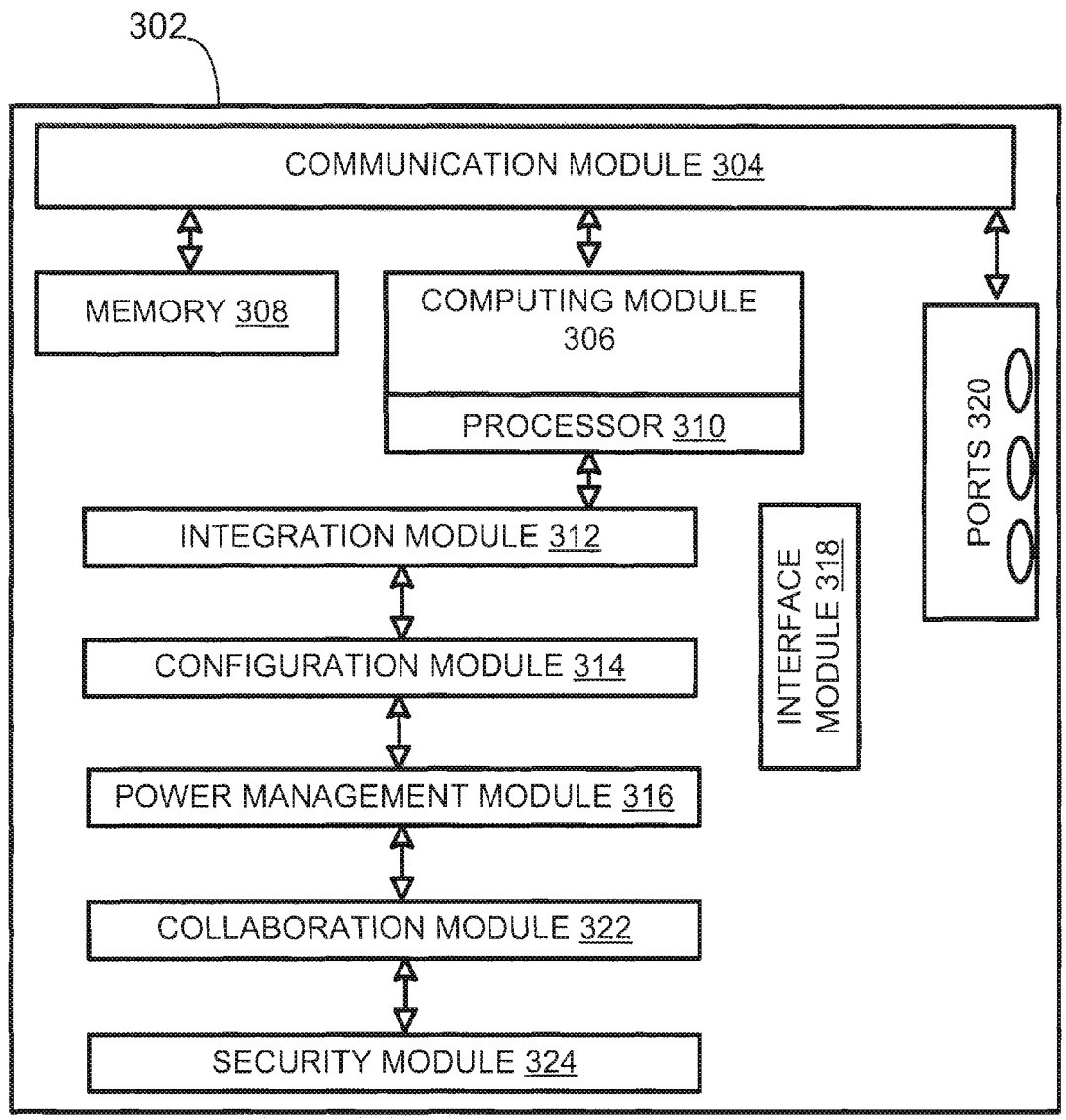

Referring to FIG. 3C, the intelligent communications device 102 may include an enclosure 302, a communication module 304, a memory 308, and a computing module 306 having a processor 310. The communication module 304 may be coupled with the memory 308 and to the computing module 306. In addition, the computing module 306 may be associated with the integration module 312 as well as interface module 318. The smart devices and/or facilities may be attached at one or more ports 320. The data received at one or more ports 320 may be forwarded to an integration module 312, a configuration module 314, a power management module 316, and the collaboration module 322. Additionally, smart devices may be incorporated into the smart grid infrastructure using a collaboration module 322.

In an embodiment of the present invention, addition of a device at one of the ports 320 may initiate integration of the device into the smart grid infrastructure. The signal received from the device may be forwarded to the interface module 318 to determine the type of device, attributes, and other details for integration with the intelligent communications device 102. Once the parameters of the devices have been ascertained, the integration module 312 and the configuration module 314 may facilitate integration for incorporating the device into the smart grid infrastructure. For example, the configuration module 314 may search for device drivers, applications and other software that may enable smooth adaptation of the device into the smart grid infrastructure.

In an embodiment of the present invention, a security module 324 may secure communication between the external smart devices and/or various facilities. For example, the security module may use encryption techniques known in the art for protecting data. Likewise, different security protocols may be implemented by the security module 324 for protecting data.

Figure 4:
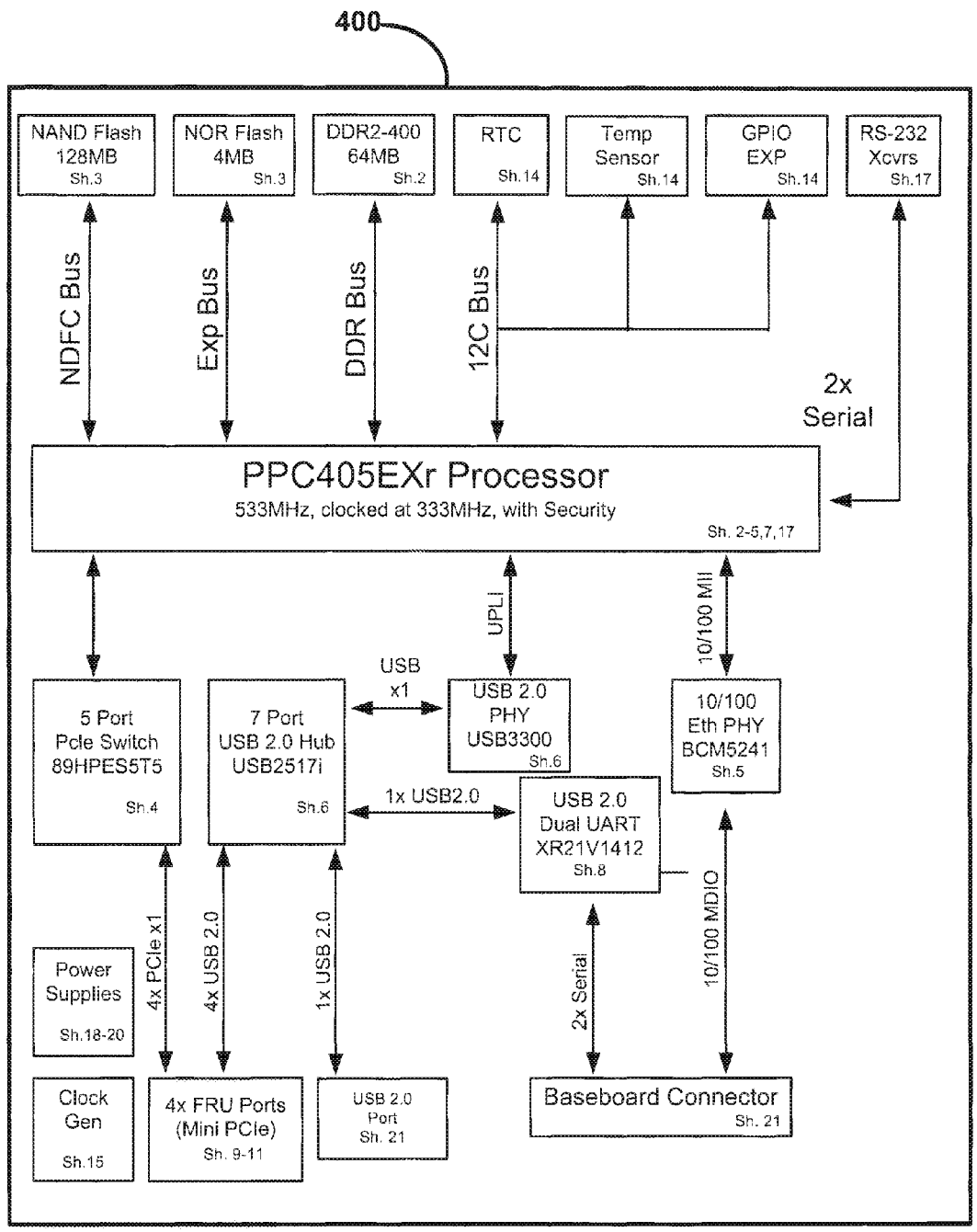
FIG. 4 schematically shows operative circuitry for an intelligent communications device according to one or more embodiments of the present invention.
Figure 5:
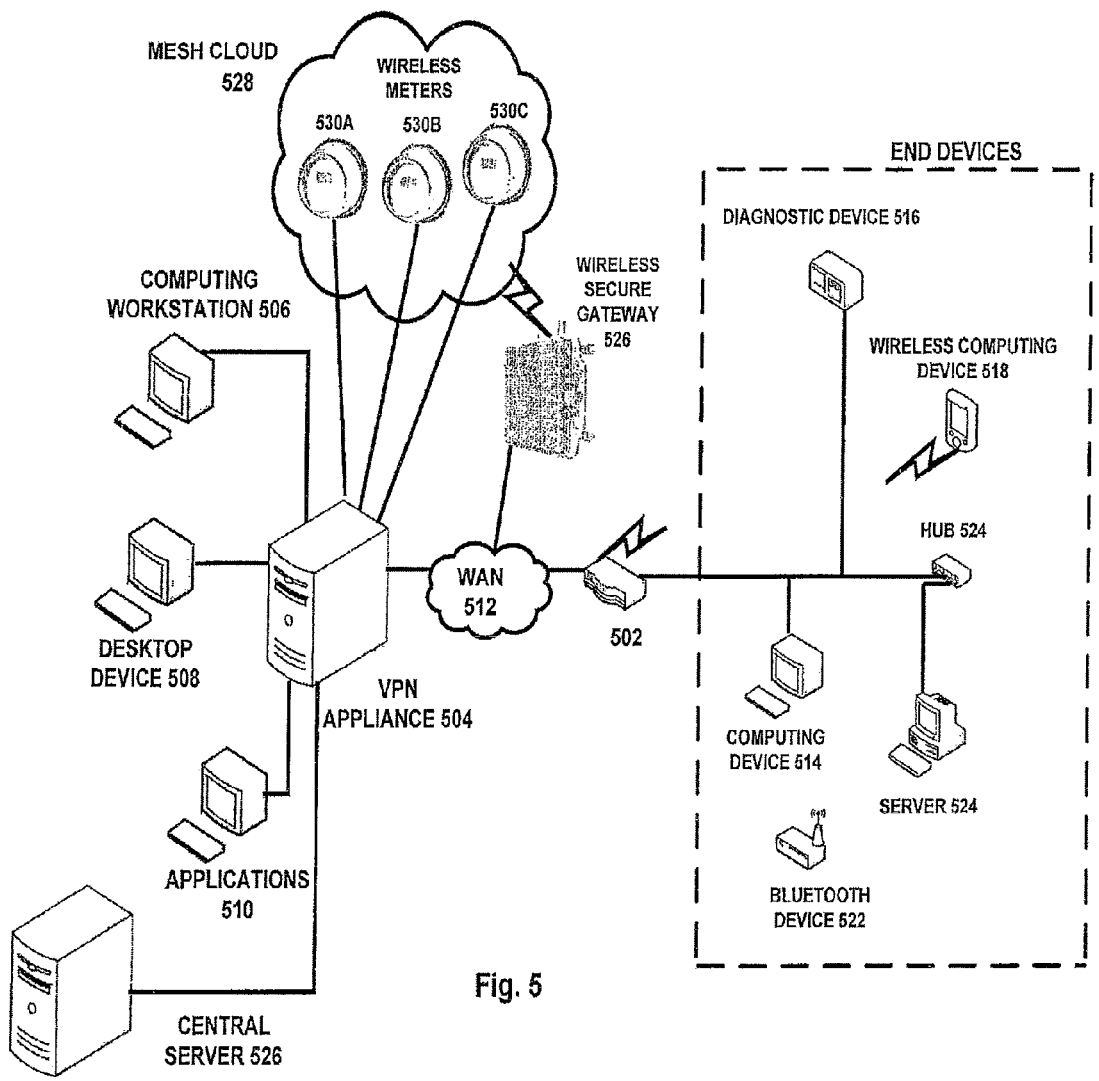
FIG. 5 illustrates an intelligent communications device implemented in a wireless mesh network, according to one embodiment of the present invention.

Referring to FIG. 4, an exemplary outlay 400 of an intelligent communications device 102 is shown, according to one embodiment of the present invention. The internal configuration of the apparatus 400 may include a NAND flash, a NOR flash, a RAM, Temperature sensor, a, RTC, a GPIO, and an interface circuitry such as RS232 coupled to the processor, such as PPC405 EXr Processor. Additionally, a plurality of ports may be interfaced with the processor, such as USB ports, Ethernet ports, switch input connectors, and/or hubs. The circuitry may receive AC/DC power from the power supply, and the power supply may deliver different voltages such as +5V, −5V, +12V, −12V, +15V, −15V and other voltages. Various connectors may be utilized for connecting different type of active and passive components. A clock generation circuitry may be provided for servicing circuits requiring clock pulses.

In an embodiment of the present invention, integrated circuits may be utilized for assembling the embodiment shown in FIG. 4 in association with other active and passive electronic components. Additionally, the circuitry may be laid on a multiple tier PCB for laying the passive and active electronic components and circuits.

Extension of IPSec Over Mesh Networks

Figure 6:
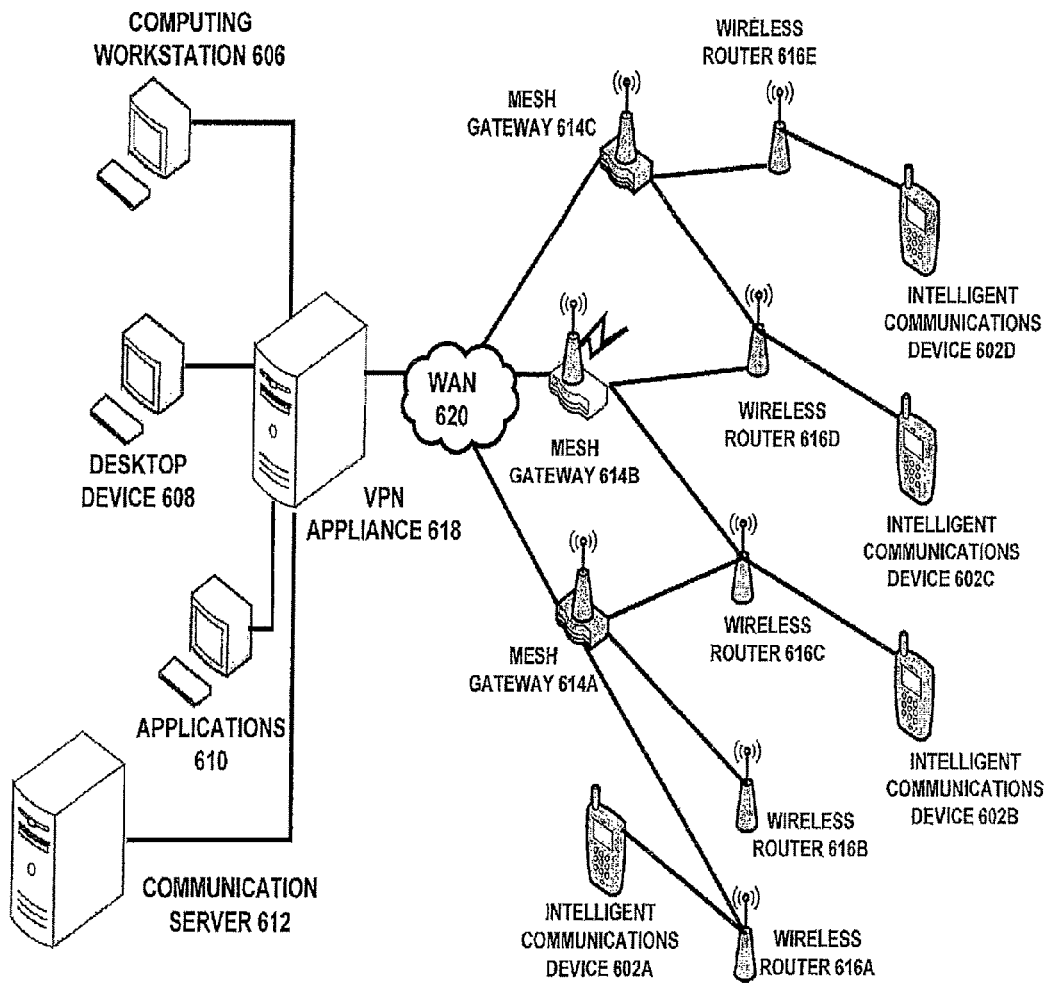
FIG. 6 illustrates intelligent communications devices implemented in a wireless mesh network, according to one embodiment of the present invention.

Now referring to FIG. 6, intelligent communications devices implemented in a wireless mesh network are shown, according to one embodiment of the present invention. The wireless mesh network includes one or more gateways such as a mesh gateway 614A, a mesh gateway 614B, and a mesh gateway 614C (hereinafter collectively referred to as "mesh gateways 614"). In addition, the mesh network may include a plurality of wireless routers (interchangeable referred to as "access points") such as a wireless routers 616A, 616B, 616C, 616D, and 616E (collectively referred to as "616"). The multiple wireless routers 616 facilitate transfer of packets from one or more of the mesh gateways 614 to the intelligent communication devices 602. As shown in the FIG. 6, multiple communication devices such as 602A, 602B, 602C, 602D, and 602E exist in the wireless mesh network. In an embodiment of the present invention, one or more wireless routers 616 directly connect to the WAN 620. Alternatively, the one or more wireless routers 616 may connect with one or more mesh gateways 614 for establishing connection with the WAN 620. In an embodiment, the coverage area provided by the wireless mesh network is referred as a "mesh cloud". The mesh cloud includes redundant paths as well as active paths for exchanging data packets in the WAN 620. Such a configuration is fault tolerant since the failure of one or more wireless routers does not affect the functioning of the wireless network.

In an embodiment of the present invention, the wireless mesh network is operational in a smart grid including multiple intelligent communication devices 602. In other embodiments, various end devices are capable of receiving wireless information. In an example, the end device may be a PDA, a laptop, a cell phone, a smart phone, a computer, a server, and/or any other digital device.

Figure 7:
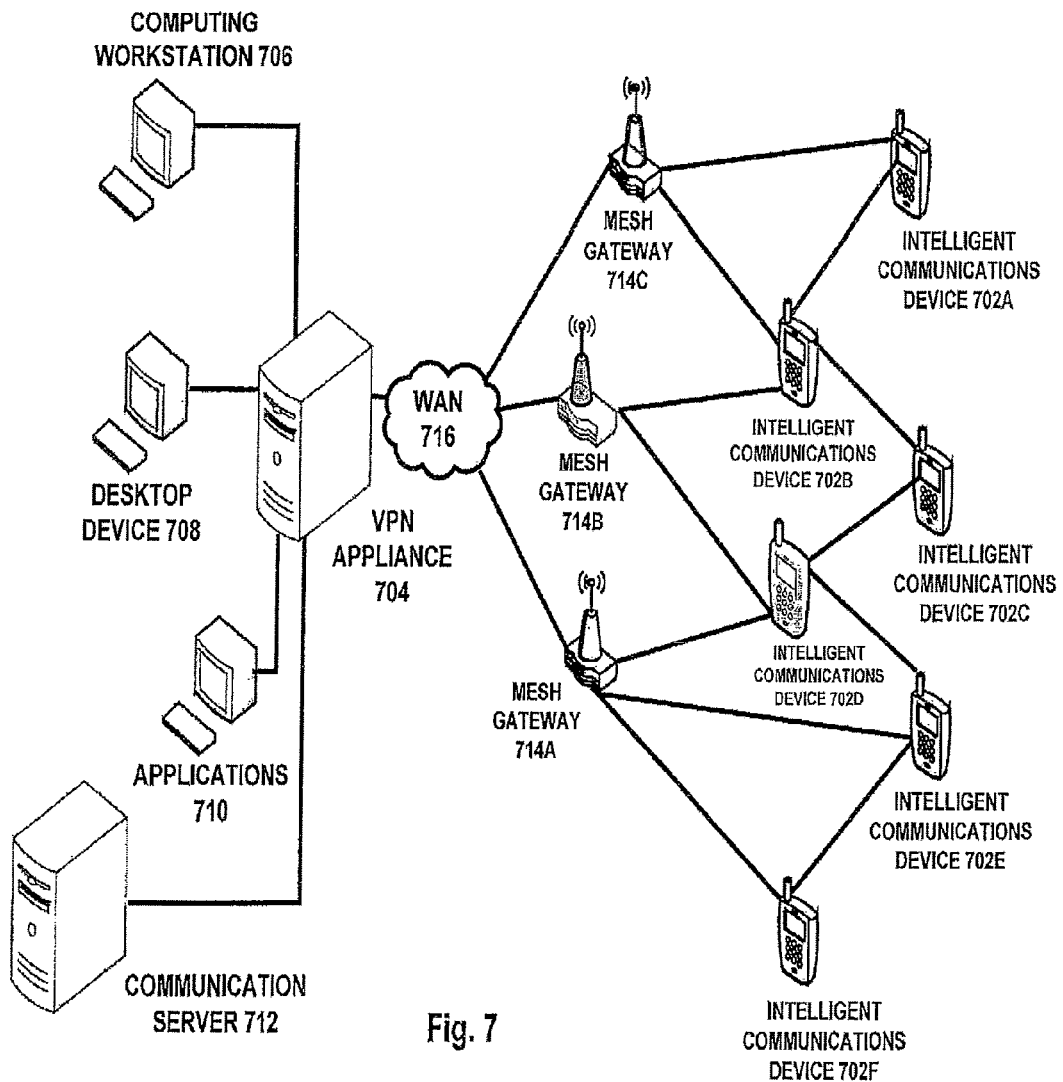
FIG. 7 illustrates intelligent communications devices implemented in a wireless mesh network, according to one embodiment of the present invention.

Referring now to FIG. 7, intelligent communications devices implemented in a wireless mesh network are shown, according to one embodiment of the present invention. As shown in FIG. 7, a plurality of devices may be configured to form a LAN; the LAN is connected to the VPN appliance 704 and finally with WAN 716. The LAN includes workstation 706, a desktop device 708, applications 710 running on a server, and a communication server 712. To secure the LAN from the external network, VPN appliance 704 is provided. The VPN appliance 704 is interfaced with the WAN 716 and subsequently to a plurality of mesh gateways such as 714A, 714B, and 714C. A plurality of intelligent communication devices 702A, 702B, 702C, 702D, 702E, 702F are connected to the wireless routers (not shown).

In one or more embodiments, the plurality of routers dispersed geographically over a large area, along with the multiple intelligent communication devices 702 form a mesh cloud. A central server may initiate a session with one or more intelligent communication devices 702 for monitoring the various parameters, for example, but not limited to, electrical consumption, quality of electricity, and electric load. Since this communication is initiated over a public network, which is vulnerable to malicious attacks, IPSec is implemented to protect the data packets. The LAN network includes a server for transferring data packets to one or more intelligent communication devices 702. In this implementation, the data packets are transferred to the VPN appliance 704. The VPN appliance 704 forms a secure connection using a tunnel mode of IPSec protocol to the mesh gateway. Further, the mesh gateways 714 utilize mesh routing protocols to transfer data packets to a destination, that is, the intelligent communication devices 702.

In one embodiment, the wireless mesh network may establish multiple paths between the plurality of wireless routers 616 and the plurality of intelligent communication devices 602 due to its topology. In such a scenario, the plurality of wireless router may implement wireless routing algorithms to identify one or more paths based on the pre-determined criteria. The predetermined criteria may be based on shortest path, least congested path, or path requiring minimum time to traverse the network form source to destination. In another embodiment, more than one paths may be identified between the plurality of wireless routers 616 and the plurality of intelligent communication devices 602.

The VPN appliance 618 after establishing one or more connections with the one or more destined intelligent communication devices 602. Thereafter, the VPN appliance 602 may initiate an inner tunnel nested within the outer tunnel to establish separate paths for each of the destined intelligent communication devices 602. In addition, the VPN appliance 618 may initiate a process to establish the identification of the destined intelligent communication devices 602. As such, the overhead for identifying the particular intelligent communication device 602 in the wireless mesh network may be minimized. For example, a data packet may considerable reduce it overhead of routing itself over the network, if the source and the destination are known. Thus, once a tunnel between the VPN appliance 618 and the destined intelligent communication device the IP header for traversing the network may be minimized.

In one embodiment the process of IP offloading after establishing a nested tunnel within the outer tunnel with each of the intelligent communication device may require very low bandwidth to operate. Thus, in an exemplary embodiment offloading may be practiced in a low bandwidth wireless mesh network.

In an embodiment, the multiple nested tunnel may be established within the outer tunnel. Each nested tunnel associated with a particular intelligent communication device 602 may allow transfer of data packets that are destined to the identified intelligent communication device 602.

In one or more embodiments, the wireless mesh network is specifically designed for use within a smart grid. To this end, the wireless mesh network is customized for both the architectural design and the protocol design.

The mesh network may utilize multiple paths to transfer data packets to the destination. For example, different paths are formed to connect with the intelligent communication devices. Now referring back to FIG. 6, a path to intelligent communication device 602C is via mesh gateway 614B and wireless router 616D. Alternatively, a path to intelligent communication device 602C is through mesh gateway 614C and wireless router 616D. It may be noted that various arrangements and configuration are formed in the wireless mesh network without deviating from the scope and spirit of the invention.

Figure 8:
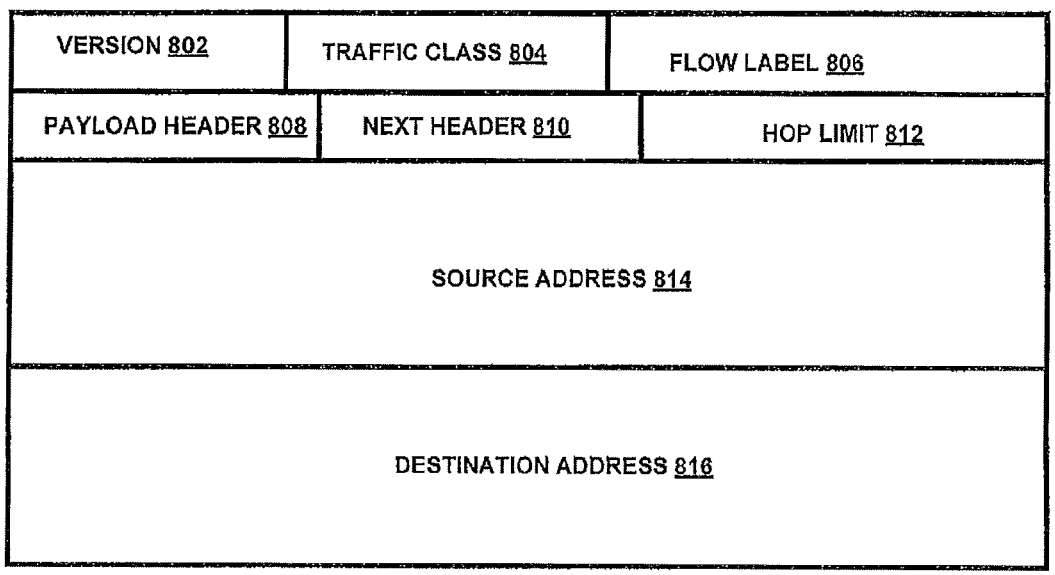
FIG. 8 illustrates a header of an internet protocol for use in one or more embodiments of the present invention.

Now referring to FIG. 8, a header of an internet protocol is shown, for utilization in one or more embodiments of the present invention. As shown in the embodiment of FIG. 8, an IPv6 includes a source address 814, a destination address 816, a version 802, flow label 806, payload header 808, next header 810, hop limit 812, and traffic class 804. In total, the IPv6 header occupies 320 bits. The IPv6 header may be reduced in size if all the packets are being routed to a pre-defined header. Reducing the size of the IP header allows the data packet to carry more payload especially in a low bandwidth environment.

In an embodiment of the present invention, a secure communications tunnel is formed between a source and destination to facilitate transfer of data packets. Such an implementation increases the capacity of the channel having a low bandwidth to exchange data packets.

Figure 9:
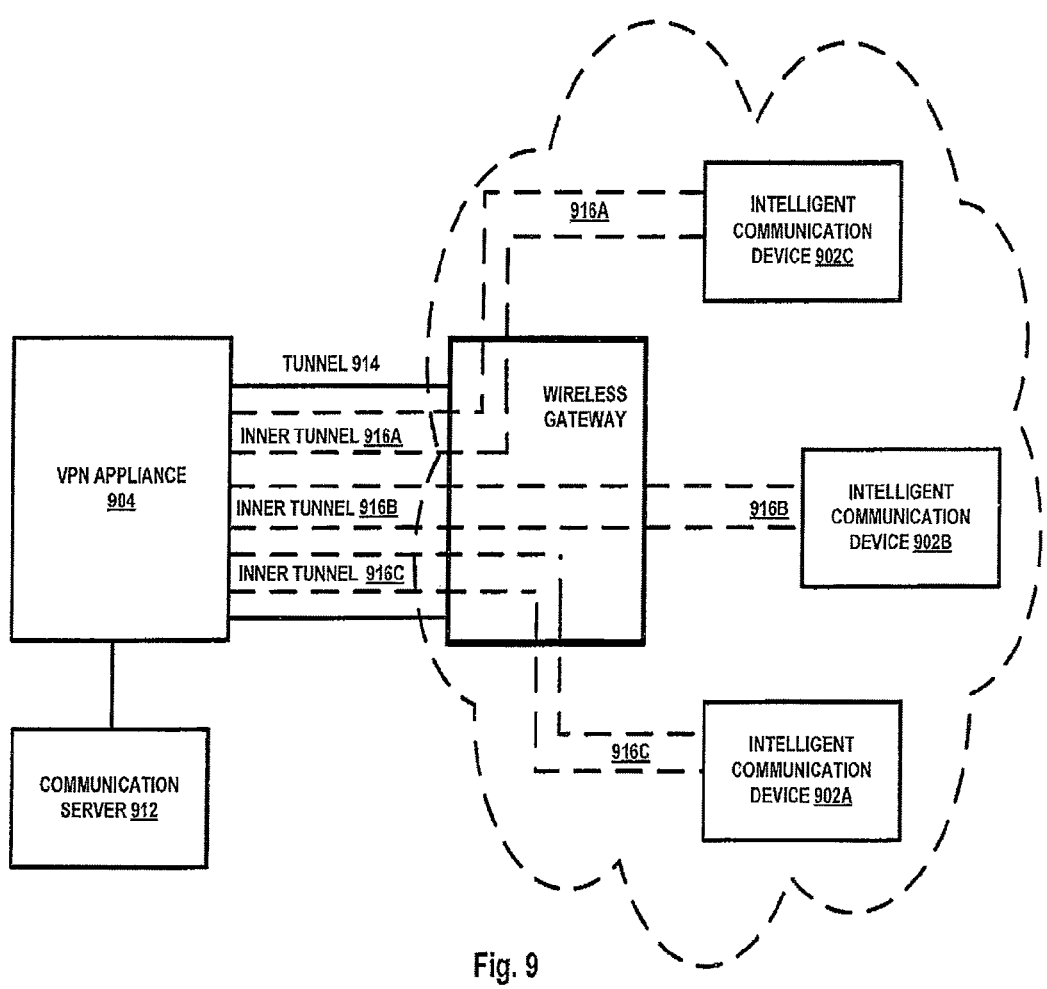
FIG. 9 illustrates secure communication tunnels operating in a network having intelligent communications devices according to one embodiment of the invention.

Now referring to FIG. 9, secure communication tunnels operating in a network with intelligent communications devices are shown, according to one embodiment of the invention. As shown, a communication server 912 attempts to establish a connection with the multiple intelligent communication devices such as 902A, 902B and 902C. For establishing a connection, the communication server 912 establishes a connection with the VPN appliance 904 operating in a LAN environment. Thereafter, the VPN appliance 904 establishes a secure connection with the mesh gateway (see, for example, mesh gateway 614A, FIG. 6). In an embodiment of the present invention, the secure connection is an IPSec connection operating in transport mode. Alternatively, the secure connection operates in a tunnel mode. The tunnel 914 established between the communication server 912 and the mesh gateway facilitates secure transfer of packet data over a public network. Subsequently, the mesh gateway establishes a wireless connection with the intelligent communication devices 902A, 902B and 902C. Nested tunnels 916A, 916B, and 916C are established within the tunnel 914 between the VPN appliance 904 and the intelligent communication devices 902A, 902B, and 902C. Establishing of such a connection reduces the IP header thereby reducing the size of a data packet. This facilitates exchange of data packets in a low bandwidth channel. In one example, a nested tunnel 916A within the tunnel 914 is established between the VPN appliance 904 and the intelligent communication device 902A. In another example, a nested tunnel 916B within the tunnel 914 is established between the VPN appliance 904 and the intelligent communication device 902B. In yet another example, a nested tunnel 916C within the tunnel 914 is established between the VPN appliance 904 and the intelligent communication device 902C.

In an embodiment of the present invention, one or more of the intelligent communication devices 102 operate as the mesh gateway.

Referring back to FIG. 6, showing IP Security between the VPN appliance 604 and the mesh gateway 614, in one or more embodiments, the IPSec may utilize Internet Key Exchange (IKE), Authentication Header (AH), and/or Encapsulating Security Payload (ESP) for implementing secure packet transfer.

In one embodiment, one or more of the intelligent communications devices 602 implement an IPSec protocol that is configurable or modifiable such that a Secure Association (SA) may remain intact for a long duration of time or by byte count without a re-key until the communication to the one or more intelligent communication devices 602 are uninterrupted. The one or more intelligent communication devices 602 ensure implementation of this requirement while operating in a smart grid network. The network performance requirement must be adhered to whether the one or more intelligent communication devices 602 operate with a static IP address or a dynamic IP address.

In an embodiment of the present invention, a secure connection established between two network entities may via secure association (SA). A secure association is the establishment of shared security attributes between two network entities to support secure communication. The secure association may include attributes such as cryptographic algorithm and mode; traffic encryption key; and parameters for the network data to be passed over the secure connection. For example, a secure association established between two entities may be configurable such that the re-key intervals under low data usage conditions expire after 30 days.

The secure association may accomplish negotiation, establishment, and management of secure connection and their attributes between two network entities. For example, there may be multiple security mechanisms with multiple options for each security mechanism. In this aspect, the secure association protocol may determine the best option to be implemented in out of multiple security mechanism.

In an embodiment of the present invention, the method as depicted in FIG. 6, FIG. 7, FIG. 8 and FIG. 9 may be implemented in a computer readable medium such as but not limited to CD, DVD, flash drive, hard disk, pen drive, data card, or some other type of memory. The intelligent communication device 102 may include required circuitry for enabling a computing apparatus such as processor to read instructions embodied on one or more computer readable medium to execute the process of establishing a outer tunnel with a nested inner tunnel for transferring data packets over a low bandwidth network.

In an embodiment of the present invention, dead peer detection may be configurable to optimize the number of retries and the duration between dead peer detection messages is tuned to make DPD responsive without generating excessive over-the-air traffic.

In an embodiment of the present invention, the VPN appliance may support NAT-T. The NAT-T keep alives may be configurable. For example, the intelligent communication device is capable of enabling, disabling, and defining the keep alive period in days.

In an embodiment of the present invention, one or more of the intelligent communication devices support MOBIKE to optimize performance when dynamic IP addresses are being utilized to eliminate the need for re-keying or when the IP address one or more of the intelligent communication devices change.

In one embodiment of the present invention, the wireless network may be a wireless adhoc network with a dynamic topology and high mobility of the intelligent communication devices.

The methods described herein may be deployed in part or in whole through one or more devices that are capable of executing computer software, program codes, and/or instructions on corresponding processors. A processor may be part of a server, client, network infrastructure, mobile computing platform, stationary computing platform, or other computing platform. The processor may be any kind of computational or processing device capable of executing program instructions, codes, and/or binary instructions. The processor may be or may include a signal processor, a digital processor, an embedded processor, a microprocessor or any variant such as a co-processor (e.g. a math co-processor, a graphic co-processor, or a communication co-processor) that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program and instructions described herein may be implemented in one or more threads. A thread may spawn other threads that may have assigned priorities associated with them; the processor may execute these threads based on a priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other types of instructions capable of being executed by the computing or processing device may include, but may not be limited to, one or more of a CD-ROM, DVD, hard disk, flash drive, RAM, ROM, and/or cache.

The processor may include one or more cores that may enhance speed and performance of a multiprocessor. In embodiments, the process may be a dual core processor, quad core processors, or other chip-level multiprocessors that combine two or more processors.

The methods and systems described herein may transform physical and/or or intangible items from one state to another.

The methods and systems described herein may also transform data representing physical and/or intangible items from one state to another.

The elements described and depicted herein, including the elements described in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, and/or routers. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the embodiments shown and described in detail, various modifications and improvements thereon will become readily apparent to those skilled in the art. Accordingly, the spirit and scope of the present invention is not to be limited by the foregoing examples.

What is claimed is:

1. A method of extending IPSec communication over a wireless mesh network, the wireless mesh network comprising a plurality of wireless mesh gateways, a plurality of wireless routers, a plurality of intelligent communication devices operating in a smart grid, and a Virtual Private Network (VPN) appliance operative to establish an end-to-end communication tunnel with at least one of the plurality of wireless mesh gateways, the method comprising: establishing a secure connection comprising an outer tunnel between the VPN appliance and at least one of the plurality of wireless mesh gateways; causing at least one wireless routing function to establish a connection with a particular intelligent communications device, wherein corresponding data packets are configured to be received at the particular intelligent communication device; identifying one of a plurality of available paths between a particular wireless mesh gateway and the particular intelligent communication device; establishing an inner tunnel within the outer tunnel for secure communication between the VPN appliance and the particular intelligent communications device; reducing the size of an IP Header to accommodate the transfer of data packets in a low bandwidth network through the inner tunnel established between the VPN appliance and the particular intelligent communications device; and wherein the plurality of intelligent communications devices comprises a diagnostic device operative to measure at least one of a quality of electricity parameter, an electrical consumption parameter, and an electric load parameter.

2. The method of claim 1, wherein the plurality of intelligent communications devices comprises a smart device.

3. The method of claim 1, wherein the plurality of intelligent communications devices comprises a smart meter.

4. The method of claim 1, wherein the plurality of intelligent communications devices comprises a wireless computing device.

5. The method of claim 1, wherein the plurality of wireless routers comprises an intelligent communications device.

6. The method of claim 1, wherein the VPN appliance comprises a hardware firewall.

7. The method of claim 1, wherein the one or more network devices comprises a software firewall.

8. A system of extending IPSec communication over a wireless mesh network, the wireless mesh network comprising a plurality of wireless mesh gateways, a plurality of wireless routers, a plurality of intelligent communications devices operating in a smart grid, and a Virtual Private Network (VPN) appliance operative to establish an end-to-end communication tunnel with at least one of the plurality of wireless mesh gateways, wherein the system comprises: a VPN appliance configured for secure communication with at least one of a plurality of the wireless mesh gateways by establishing an outer tunnel, wherein at least one of the plurality of wireless mesh gateways is configured to establish connection with the plurality of wireless routers, wherein the plurality of wireless routers is configured to establish connection with a plurality of intelligent communications devices, wherein multiple paths exist for routing data packets from the plurality of wireless mesh gateways to the plurality of intelligent communications devices, wherein the VPN appliance is further configured to establish a plurality of inner tunnels nested within the outer tunnel to form a connection with the plurality of intelligent communications devices for initiating a data transfer over a low bandwidth communication channel, wherein the IP header is reduced in size to accommodate the transfer of data packets over the low bandwidth communication channel, and wherein the plurality of intelligent communications devices comprises a diagnostic device operative to measure at least one of a quality of electricity parameter, an electrical consumption parameter, and an electric load parameter.

9. The system of claim 8, wherein the plurality of intelligent communications devices comprises a smart device.

10. The system of claim 8, wherein the plurality of intelligent communications devices comprises a smart meter.

11. The system of claim 8, wherein the plurality of intelligent communications devices comprises a wireless computing device.

12. The system of claim 8, wherein the plurality of wireless routers comprises a intelligent communications device.

13. The system of claim 8, wherein the VPN appliance comprises a hardware firewall.

14. The system of claim 8, wherein the one or more network devices comprises a software firewall.

15. A non-transitory computer-readable medium having stored thereon computer-executable instructions which, when executed by one or more processors, perform functions for extending IPSec communication over a wireless mesh network, the wireless mesh network comprising a plurality of wireless mesh gateways, a plurality of wireless routers, a plurality of intelligent communication devices operating in a smart grid, and a Virtual Private Network (VPN) appliance operative to establish an end-to-end communication tunnel with at least one of the plurality of wireless mesh gateways, the instructions comprising: instructions for establishing a secure connection comprising an outer tunnel between the VPN appliance and at least one of the plurality of wireless mesh gateways; instructions for causing at least one routing function to establish a connection with a particular intelligent communications device, wherein the data packet is configured to be received at the particular intelligent communication device; instructions for identifying one of a plurality of available paths between the wireless mesh gateway and a particular intelligent communication device; instructions for establishing an inner tunnel within the outer tunnel for secure communication between the VPN appliance and the particular intelligent communications device; and instructions for reducing the size of the IP Header to accommodate the transfer of data packets in a low bandwidth network over the inner tunnel established between the VPN appliance and the particular intelligent communication device, and wherein the plurality of intelligent communications devices comprises a diagnostic device operative to measure at least one of a quality of electricity parameter, an electrical consumption parameter, and an electric load parameter.

16. The non-transitory computer-readable medium of claim 15, wherein the plurality of intelligent communication devices implements an Internet Protocol (IP).

17. The non-transitory computer-readable medium of claim 16, wherein header information of the IP is reduced to lesser to route packets between the source and destination over a pre-established inner tunnel.

18. The non-transitory computer-readable medium of claim 15, wherein the inner tunnel is established between a source and a destination to accelerate transfer of data packets over a low bandwidth channel.

* * * * *